Jan. 29, 1957  D. R. CARLSON  2,779,524
TRUNK LUGGAGE RACK

Filed June 22, 1954  2 Sheets-Sheet 1

Donald R. Carlson
INVENTOR.

BY *(signatures)*
Attorneys

Jan. 29, 1957 D. R. CARLSON 2,779,524
TRUNK LUGGAGE RACK
Filed June 22, 1954 2 Sheets-Sheet 2
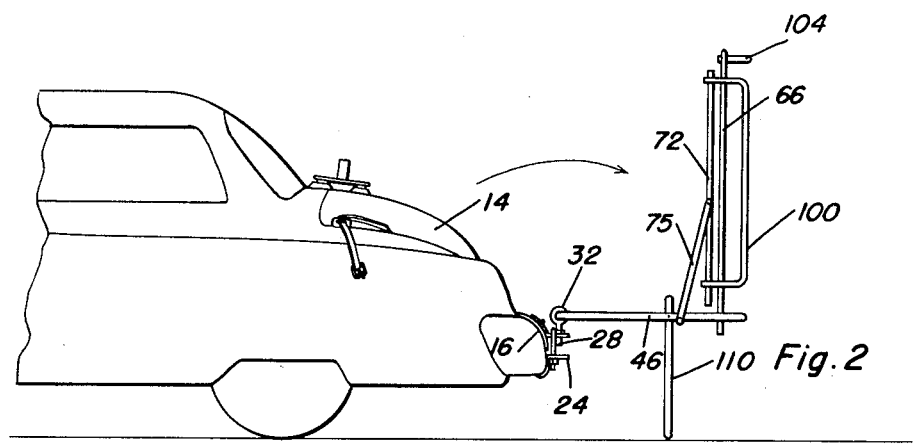
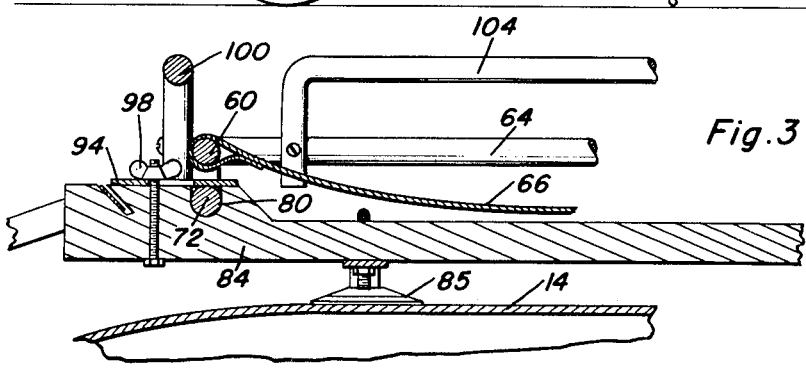
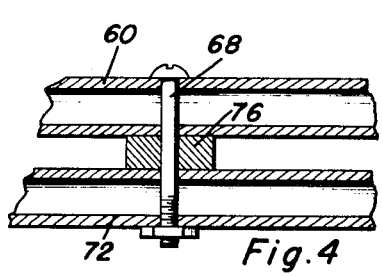
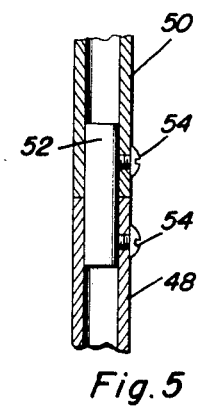
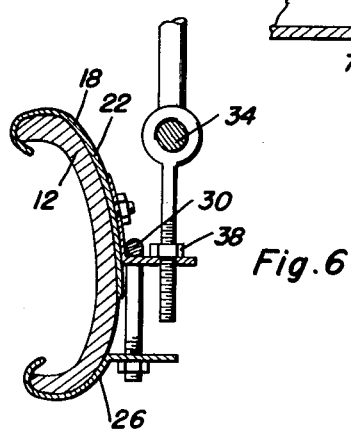
Donald R. Carlson
INVENTOR.

United States Patent Office 2,779,524
Patented Jan. 29, 1957

2,779,524

TRUNK LUGGAGE RACK

Donald R. Carlson, Sioux City, Iowa, assignor to Cardis Manufacturing Company, Incorporated, Sioux City, Iowa, a corporation of Iowa Application June 22, 1954, Serial No. 438,376

2 Claims. (Cl. 224—42.08)

This invention relates to a luggage rack adapted to be mounted on a vehicle and more particularly to an automobile trunk luggage rack.

The primary object of the present invention resides in the provision of a rack which is adapted to be attached to the rear bumper of various makes and models of automobiles and to the trunk lid thereof while being adapted to be rotated away from overlying relationship with respect to the trunk with even a full load strapped thereto.

Another object of the invention resides in the provision of a trunk mounted luggage rack on which sectional boats, outboard motors, luggage, and various other items may be easily carried and which is adjustable for various makes and models of vehicles regardless of the conformation of the bumpers and the trunk lids thereof.

Still further objects and features of this invention reside in the provision of a trunk luggage rack which is strong and durable, simple in construction and manufacture, easy to dismantle and store in a relatively small compass, and which is highly efficient in operation while being simple to utilize.

These, together with the various ancillary objects and features of the invention which will become apparent as the following description proceeds, are attained by this automobile trunk luggage rack, a preferred embodiment of which has been illustrated in the accompanying drawings, by way of example only, wherein:

Figure 2 is a side elevational view of the luggage rack shown in a position whereby access may be had to the trunk of the vehicle;

Figure 3 is an enlarged vertical sectional view as taken along the line of plane 3—3 in Figure 1;

Figure 4 is an enlarged sectional detailed view as taken along the plane of line 4—4 in Figure 1 illustrating the manner of mounting of the supporting platform of the rack;

Figure 5 is an enlarged sectional detailed view as taken along the plane of line 5—5 in Figure 1 illustrating the manner in which the rear support member is formed in detachable sections; and Figure 6 is an enlarged sectional view as taken along the plane of line 6—6 in Figure 1 illustrating the construction of the clamps used to secure the rack to a bumper.

Figure 1:
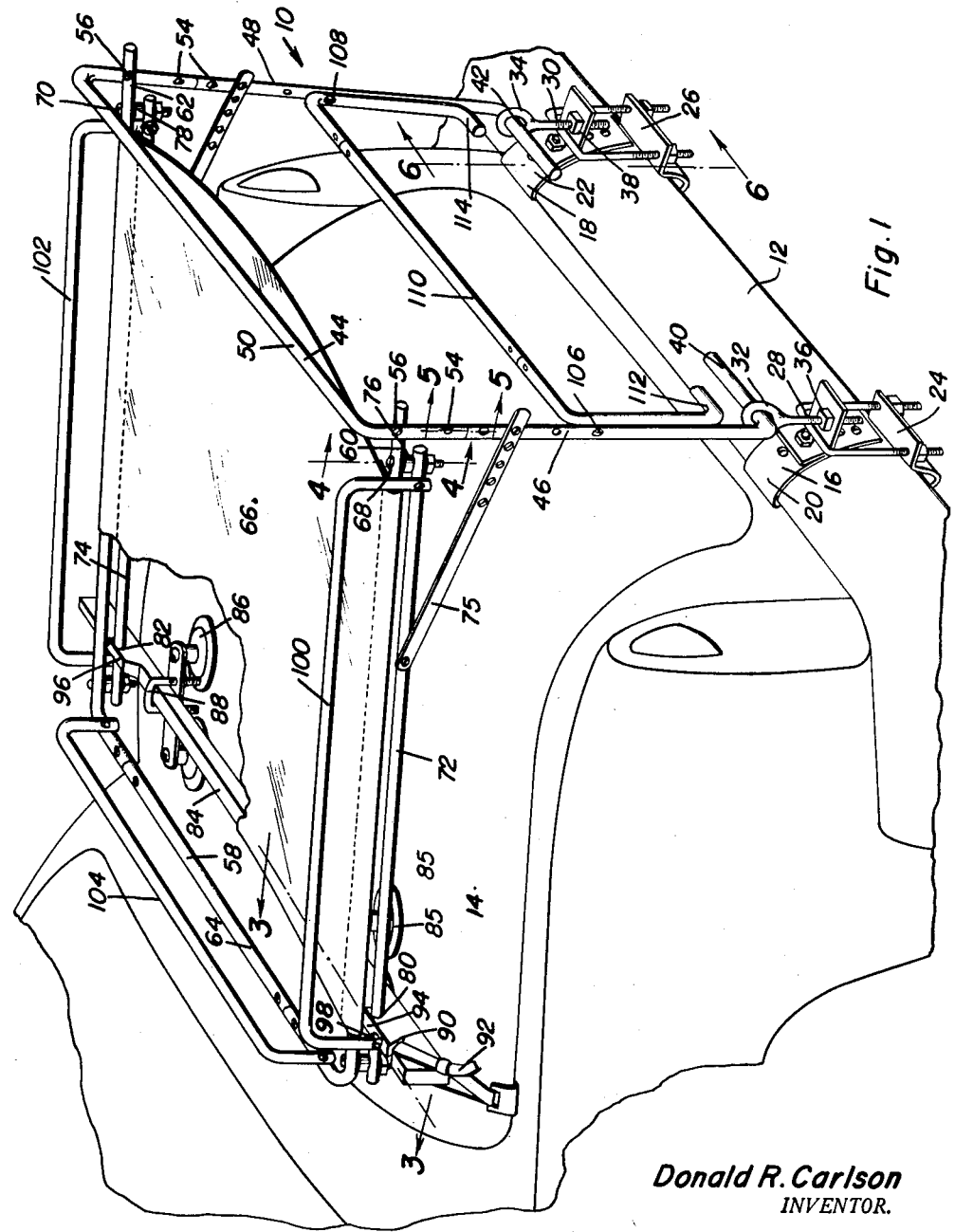
Figure 1 is a perspective view of the automobile trunk luggage rack shown as operatively placed ready for receiving luggage thereon.

With continuing reference to the accompanying drawings wherein like reference numerals designate similar parts throughout the various views, reference numeral 10 generally designates the automobile trunk luggage rack comprising the present invention which is adapted to be secured to the bumper 12 of a vehicle and to the trunk lid 14 thereof. Clamps 16 and 18 are utilized to attach the luggage rack 10 to the bumper 12 and include upper and lower clamp sections 20, 22 and 24, 26 which are clampingly held together by substantially U-shaped clamping elements 28 and 30. Eye bolts 32 and 34 are threadedly adjustably secured to the upper clamping plates 20 and 22, respectively, and are held in position by suitable nuts 36 and 38 affixed to the horizontal portions of the upper clamping plates 20 and 22. Engaged in the eyes 32 and 34 are end portions 40 and 42 of a substantially U-shaped rear support member 44 having spaced leg portions 46 and 48 interconnected by substantially U-shaped upper connecting portion 50. The rear support 44 is formed of tubular material and as can be best seen in Figure 5 the connection between the upper connecting portion 50 and the legs 46 and 48 is formed by an insert 52 which is received in the tubular sections and held in place by setscrews as at 54.

Secured by fasteners 56 to the support member 50 is a substantially U-shaped frame 58 having side portions 60 and 62 interconnected by an end connecting portion 64 which is attached to the side portions 60 and 62 by an insert arrangement similar to that forming the connection between the connecting portion 50 and the legs 46 and 48. A canvas platform 66 is stretched between the sides 60 and 62, for supporting luggage, or any other items for which this luggage rack is designed to carry.

By means of fasteners 68 and 70 platform support members 72 and 74 are secured to the side members 60 and 62 and spaced therefrom by means of spacer blocks 76 and 78. This construction can be best seen in Figures 1 and 4. Suitable adjustable angular brace elements 75 are suitably secured between members 72, 46, and 74, 48 as seen in Figure 1. The platform support members 72 and 74 extend into recesses 80 and 82 formed in a transverse bar 84 formed of oak or other suitable material. The transverse bar 84 is held in position on the trunk lid 14 by means of suction cups arranged in sets as at 85 and 86 which are adjustably secured to the transverse bar 84 by clamp members as at 88. Slots 90 are formed in the transverse bar 84 so that straps 92 can be utilized to securely fasten down the transverse bar 84 on the trunk lid 14 thus compressing the suction cups 86.

Overlying the recesses 80 and 82 in the transverse bar 84 are plates 94 and 96 which as can be seen best in Figure 3 are detachably held in position by fasteners 98 so as to retain the platform support members 72 and 74 within the recesses 80 and 82, respectively. With the plates 94 and 96 removed from overlying relationship relative to the recesses 80 and 82, it is possible to remove the platform support members 72 and 74 out of the recesses 80 and 82 so that the entire platform 66 can be rotated to the position as is shown in Figure 2 leaving the transverse bar 84 and its appertaining elements retained on the trunk lid thereby permitting access to the trunk lid and the trunk even with a full load strapped to the platform 66.

Secured to the platform support members 72 and 74 as well as to the front portions of the frame 58 are U-shaped guards 100, 102, and 104. These may be optionally used and enable the luggage, sectional boats, or the like, to be more easily secured on the platform 66.

Pivotally secured to the legs 48 and 50 by means of fasteners 106 and 108 is a sectional U-shaped member 110 having ground engaging portions 112 and 114 which are adapted to support the trunk luggage rack when in the lower position as is shown in Figure 2.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. An automobile trunk luggage rack comprising a rear U-shaped member having side legs and a top bight portion, clamps attachable to an automobile rear bumper and having said legs terminally pivoted thereon for swinging of said support into vertical position behind an automobile trunk, a U-shaped frame adapted to extend forwardly from said rear member over a trunk and having a front bight portion and side legs extending rearwardly from said front bight portion and terminally secured to the side legs of said rear member, a platform extending between the side legs of said frame, a pair of support bars for said frame underlying and secured to the legs of said frame in spaced parallel relation thereto and to said platform, and a bar cross connecting said support bars and slidable along the same and having means thereon attachable to a trunk lid.

2. The combination of claim 1, and guard rails of inverted U-shape extending along and secured to said support bars and to the bight portion of said frame and extending above said platform.

References Cited in the file of this patent

UNITED STATES PATENTS

| | | |
|---|---|---|
| 2,170,987 | Chambers | Aug. 29, 1939 |
| 2,479,035 | Burkey | Aug. 16, 1949 |
| 2,567,104 | Di Fonzo | Sept. 4, 1951 |
| 2,594,319 | Law | Apr. 29, 1952 |

FOREIGN PATENTS

| | | |
|---|---|---|
| 1,014,232 | France | May 28, 1952 |